United States Patent
Natali et al.

(10) Patent No.: US 11,498,844 B2
(45) Date of Patent: Nov. 15, 2022

(54) AMMONIA PRODUCTION METHOD AND APPARATUS FOR AMMONIA PRODUCTION

(71) Applicant: VICTORIA LINK LIMITED, Wellington (NZ)

(72) Inventors: Franck Natali, Porirua (NZ); Benjamin John Ruck, Lowerhutt (NZ); Harry Joseph Trodahl, Wellington (NZ)

(73) Assignee: VICTORIA LINK LIMITED, Wellington (NZ)

( * ) Notice: Subject to any disclaimer, the term of this patent is extended or adjusted under 35 U.S.C. 154(b) by 327 days.

(21) Appl. No.: 16/628,214

(22) PCT Filed: Jul. 2, 2018

(86) PCT No.: PCT/IB2018/054910
§ 371 (c)(1),
(2) Date: Jan. 2, 2020

(87) PCT Pub. No.: WO2019/008504
PCT Pub. Date: Jan. 10, 2019

(65) Prior Publication Data
US 2021/0139338 A1  May 13, 2021

(30) Foreign Application Priority Data
Jul. 3, 2017 (EP) .................................... 17179326

(51) Int. Cl.
*C01C 1/04* (2006.01)
(52) U.S. Cl.
CPC .......... *C01C 1/0411* (2013.01); *C01C 1/0417* (2013.01)
(58) Field of Classification Search
CPC ............ C01C 1/026; C01C 1/00–0458; C01C 1/0476; Y02P 20/52; B01J 27/24; C01B 21/0627
See application file for complete search history.

(56) References Cited

U.S. PATENT DOCUMENTS

| 2008/0019903 A1 | 1/2008 | Wegner |
| 2008/0213157 A1* | 9/2008 | McGrady .............. C01C 1/0405 423/353 |

FOREIGN PATENT DOCUMENTS

| CH | 251 380 | 10/1947 |
| DE | 406 961 | 12/1924 |
| JP | 2011-246311 | 12/2011 |

OTHER PUBLICATIONS

Google machine translation of JP2011246311. Printed Feb. 22, 2022. (Year: 2022).*
Dröse, Peter, et al., "Structural Investigation of Homoleptic Lanthanide(III) Tri(pivalamidinates), [tBuC(NiPr)2]3Ln (Ln=Ce, Eu, Tb)", Z. Anorg. Allg. Chem., vol. 637, 2010, pp. 186-189.
Takeshita, T., et al., "Rare Earth Intermetallics as Synthetic Ammonia Catalysts", Journal of Catalysis, vol. 44, No. 2, 1976, pp. 236-243.
Thiede, Tobias B., et al., "Evaluation of Homoleptic Guanidinate and Amidinate Complexes of Gadolinium and Dysprosium for MOCVD of Rare-Earth Nitride Thin Films", Chemistry of Materials, vol. 23, 2011, pp. 1430-1440.
Waggoner, K. M., et al., "Structural and Spectroscopic Characterization of the Compounds [Al(NMe2)3]2, [Ga(NMe2)3]2, [(Me2N)2Al{μ-N(H)1-Ad}]2 (1-Ad=1-Adamantanyl) and [{Me(μ-NPh2)Al}2NPh(μ-C6H4)]", Polyhedron, vol. 9, No. 2/3, 1990, pp. 257-263.
International Search Report for PCT/IB2018/054910 dated Sep. 19, 2018, 5 pages.
Written Opinion of the ISA for PCT/IB2018/054910 dated Sep. 19, 2018, 6 pages.

* cited by examiner

*Primary Examiner* — Anthony J Zimmer
(74) *Attorney, Agent, or Firm* — Nixon & Vanderhye P.C.

(57) ABSTRACT

The present invention concerns an ammonia production method comprising the steps of: providing at least one rare earth nitride material or layer in a chamber; creating a vacuum or an inert atmosphere in the chamber; and providing hydrogen $H_2$ to react with nitrogen N released at an external surface of the at least one rare earth nitride material or layer to produce ammonia.

17 Claims, 8 Drawing Sheets

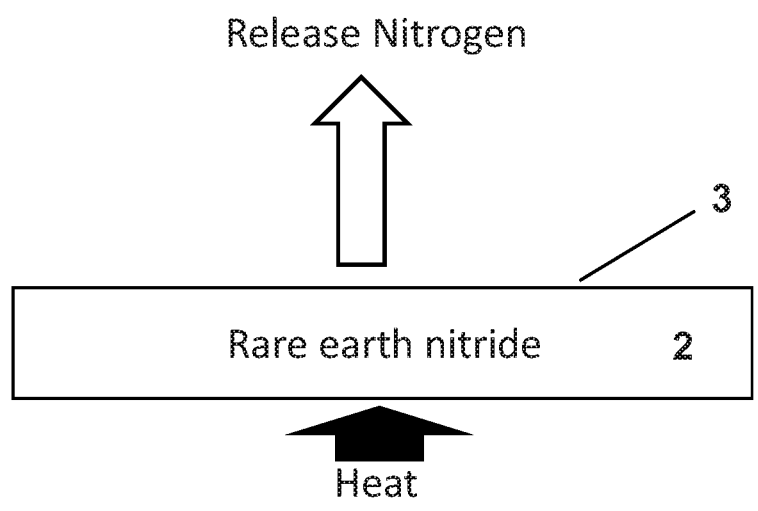
Figure 1A
Figure 1B
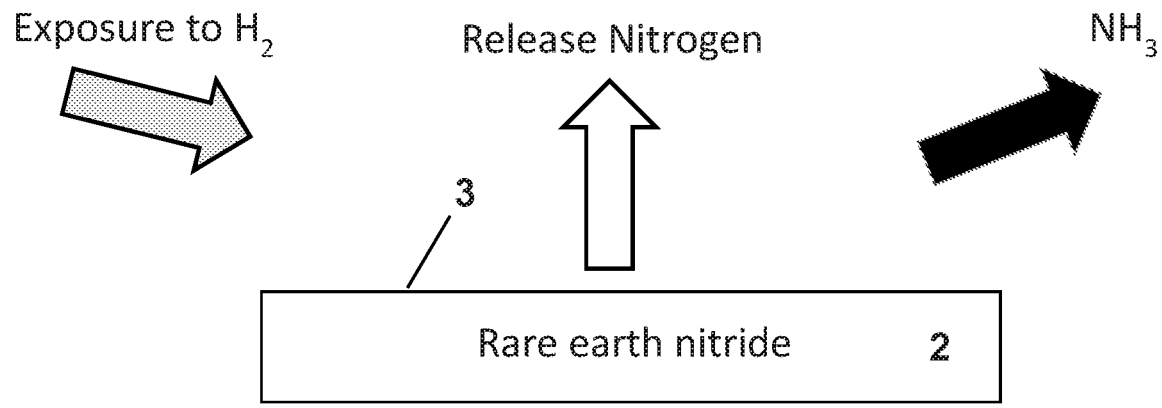
Figure 1C

AMMONIA PRODUCTION METHOD AND APPARATUS FOR AMMONIA PRODUCTION

CROSS-REFERENCE TO RELATED APPLICATIONS

This application is the U.S. national phase of International Application No. PCT/IB2018/054910 filed Jul. 2, 2018 which designated the U.S. and claims priority to EP Patent Application 17179326.8 filed on Jul. 3, 2017, the entire contents of each of which are incorporated by reference.

FIELD OF THE INVENTION

The present invention relates to the field of ammonia $NH_3$ production and more particularly ammonia $NH_3$ production using rare earth and rare earth nitride materials and structures. The present invention also concerns an apparatus configured to carry out the ammonia $NH_3$ production method. The present invention also concerns ammonia produced using the ammonia $NH_3$ production method.

BACKGROUND

The dissociation of molecular nitrogen ($N_2$) is one of the rate-limiting processes for commercial advances in the Haber-Bosch process for ammonia ($NH_3$) production. This industrial process, often called the most important invention of the 20th Century, is at the heart of the commercial production of $NH_3$, which is used as an indispensable precursor for the production of fertilizers in crop production, and thus essential to supporting the world's population. It is expected that fertilizer use will increase in the next decades.

A main challenge in the $NH_3$ synthesis is to tear apart the triple bond of molecular nitrogen ($N_2$). Industrially, the cleavage of the $N_2$ bond requires a solid catalyst, and even with the best-known catalyst (iron or ruthenium-based metals), it is feasible only under extreme conditions of high temperatures (400 to 600° C.) and pressures (20 to 40 MPa), resulting to a substantial carbon footprint. Therefore, a more environmentally benign production process that could function under milder conditions would be highly advantageous.

Catalysts that allow a facile breaking of $N_2$ and a potential energy-efficient $NH_3$ synthesis, including typically enzymatic and organometallic approaches and electro- and photocatalytic materials, are still at an early stage of development.

While encouraging progress has been made, it has been focused on relatively complex approaches suffering from a number of drawbacks such as the need for complex and large atomic cluster-based catalysts, their inherent difficulty to be treated theoretically and the lack of appropriate in-situ characterisation to observe and describe catalytic reaction at surfaces.

JP2011246311 discloses a method for producing ammonia $NH_3$. However, this method requires extreme conditions of high temperatures (400 to 600° C.) and high pressures (0.1 MPa to 2 MPa) the produce ammonia $NH_3$.

SUMMARY

It is therefore one aspect of the present disclosure to provide a method that overcomes the above-mentioned inconveniences.

The ammonia production method preferably comprises the steps of:
providing at least one rare earth nitride material or layer in a chamber;
creating a vacuum in the chamber; or alternatively creating an inert atmosphere in the chamber; and
providing hydrogen $H_2$ to react with nitrogen N or monatomic nitrogen atoms N released at an external surface of the at least one rare earth nitride material or layer to produce ammonia.

In contrast to previously mentioned ammonia production methods, the radically different approach of the present invention is based on using an atomically clean surface of a rare earth material to produce a very efficient breaking of molecular $N_2$ under extremely mild conditions. The inventors have found rare-earth atoms to break and dissociate the $N_2$ molecule at room temperature and under pressures much lower than one atmosphere, typically 7 to 8 orders of magnitude smaller. The formed rare earth nitride is able to store nitrogen and release nitrogen to allow ammonia to be produced when $H_2$ is provided.

The vacuum environment or inert atmosphere assures not only efficient and optimised breaking of $N_2$ but also efficient nitrogen release as well as efficient and optimised $NH_3$ reaction and production.

According to another aspect of the present disclosure, the at least one rare earth nitride material or layer comprises an external surface consisting solely of rare earth nitride atoms; or an external surface including at least one area consisting solely of rare earth nitride atoms; or a plurality of areas consisting solely of rare earth nitride atoms, said at least one area or each of said plurality of areas being a sub-area of a surface defined by the external surface.

According to another aspect of the present disclosure, the external surface is an atomically clean rare earth nitride external surface.

According to another aspect of the present disclosure, the method further includes the steps of: applying energy to the at least one rare earth nitride material or layer to release nitrogen N or monatomic nitrogen atoms N.

According to another aspect of the present disclosure, the method further includes the steps of:
providing at least one rare earth material or layer comprising an external surface, or at least one rare earth material or layer comprising an atomically clean rare earth external surface, or at least one rare earth material or layer comprising an external surface including at least one area consisting solely of rare earth atoms; or a plurality of areas consisting solely of rare earth atoms, said at least one area or each of said plurality of areas being a sub-area of a surface defined by the external surface; and
exposing the external surface or the atomically clean rare earth external surface to molecular nitrogen $N_2$ to produce the at least one rare earth nitride material or layer.

According to another aspect of the present disclosure, the method further includes the step of:
removing or reducing the exposure to molecular nitrogen $N_2$ following production of the at least one rare earth nitride material or layer.

According to another aspect of the present disclosure, after removing or reducing the exposure to molecular nitrogen $N_2$, hydrogen $H_2$ is provided to react with nitrogen N or monatomic nitrogen atoms N released at an external surface of the at least one rare earth nitride material or layer to produce ammonia $NH_3$.

According to another aspect of the present disclosure, the external surface is simultaneously exposed to a molecular nitrogen $N_2$ and hydrogen $H_2$ gas mixture.

According to another aspect of the present disclosure, the method further includes the steps of:
- providing a substrate; and
- depositing at least one rare earth element on the substrate to produce the at least one rare earth material or layer.

According to another aspect of the present disclosure, the providing and exposing steps are carried out simultaneously.

According to another aspect of the present disclosure the method further includes the steps of:
- removing a capping material or layer from the at least one rare earth nitride material or layer to expose the rare earth nitride external surface or the atomically clean rare earth nitride external surface.

According to another aspect of the present disclosure, the method further includes the step of carrying out an exposition to molecular nitrogen to replenish the depleted rare earth nitride material or layer following ammonia production.

According to another aspect of the present disclosure, the steps of providing at least one rare earth material or layer and exposing the at least one rare earth material or layer to molecular nitrogen $N_2$ are carried out in the chamber, or in a second chamber, or in a second chamber interconnected to the chamber.

According to another aspect of the present disclosure, the rare earth material or layer includes or consists of lanthanum La, or cerium Ce, or praseodymium Pr, or neodymium Nd, or samarium Sm, or europium Eu, or gadolinium Gd, or terbium Tb, or dysprosium Dy, or holmium Ho, or erbium Er, or thulium Tm, or ytterbium Yb, or lutetium Lu.

According to another aspect of the present disclosure, the rare earth nitride material or layer includes or consists of lanthanum nitride LaN, or cerium nitride CeN, or praseodymium nitride PrN, or neodymium nitride NdN, or samarium nitride SmN, or europium nitride EuN, or gadolinium nitride GdN, or terbium nitride TbN, or dysprosium nitride DyN, or holmium nitride HoN, or erbium nitride ErN, or thulium nitride TmN, or ytterbium nitride YbN, or lutetium nitride LuN.

According to another aspect of the present disclosure, the rare earth nitride material or layer includes or consists of at least one rare earth nitride alloy of any two or more of the rare earth nitrides selected from the following group: lanthanum nitride LaN, cerium nitride CeN, praseodymium nitride PrN, neodymium nitride NdN, samarium nitride SmN, europium nitride EuN, gadolinium nitride GdN, terbium nitride TbN, dysprosium nitride DyN, holmium nitride HoN, erbium nitride ErN, thulium nitride TmN, ytterbium nitride YbN, lutetium nitride LuN.

According to another aspect of the present disclosure, the at least one rare earth nitride material or layer is included in a structure comprising one, or multiple rare earth nitride materials or layers, or multiple and different rare earth nitride materials or layers.

According to another aspect of the present disclosure, the structure includes a substrate or a template, the rare earth nitride material or layer being located on the substrate or template or in direct contact with the substrate or template.

According to another aspect of the present disclosure, the at least one rare earth nitride material or layer has a thickness between 1 and 2000 nm.

According to another aspect of the present disclosure, the at least one rare earth nitride material or layer is epitaxial, polycrystalline or amorphous; and/or the at least one rare earth material or layer is epitaxial, polycrystalline or amorphous.

According to another aspect of the present disclosure, the at least one rare earth nitride layer or material is non-oxidised, and/or the at least one rare earth material or layer is non-oxidised.

According to yet another aspect, the present disclosure provides an apparatus configured to carry out the above-mentioned method. The present invention also concerns the ammonia produced using the above-mentioned method.

Rare earth (RE) elements are a set of fifteen chemical elements in the periodic table, consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). While named rare earths, they are in fact not rare and are relatively abundant in the Earth's crust with the exception of promethium, which has no stable nuclear isotope.

One key aspect and advantage of the present invention is the ability to dissociate easily $N_2$ molecules, among the strongest bonds in nature.

The present invention uses, for example, a metallic thin deposition or layer of rare earth (RE) material as a building block for the production of ammonia ($NH_3$) under extremely mild conditions (room temperature and low pressure) compared to current industrial methods. The RE surface facilitates the breaking of the very strong triple bond of molecular nitrogen ($N_2$) forming a rare earth nitride allowing nitrogen to be provided which can then recombine with hydrogen to produce ammonia.

For example, the production of $NH_3$ using a REN substrate can be carried out as follows:
- Deposition of a rare earth material or layer for example on a substrate,
- Exposure of the rare earth material or layer to molecular nitrogen $N_2$ (for example, at low pressure and at room temperature): pure $RE+N_2 \rightarrow REN$ material or layer
- Stopping $N_2$ in a growth chamber so that the REN material or layer releases nitrogen N, preferably under vacuum or an inert atmosphere, to react with $H_2$ to produce $NH_3$. Optionally, the REN material or layer can be heated in the presence of $H_2$.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

FIGS. 1A to 1C schematically shows different exemplary steps of the ammonia production method according to one aspect of the present invention;

FIG. 2A schematically shows another exemplary step of the ammonia production method according to an aspect of the present invention;

FIG. 2B schematically shows another exemplary step of the ammonia production method according to an aspect of the present invention;

Figure 5:
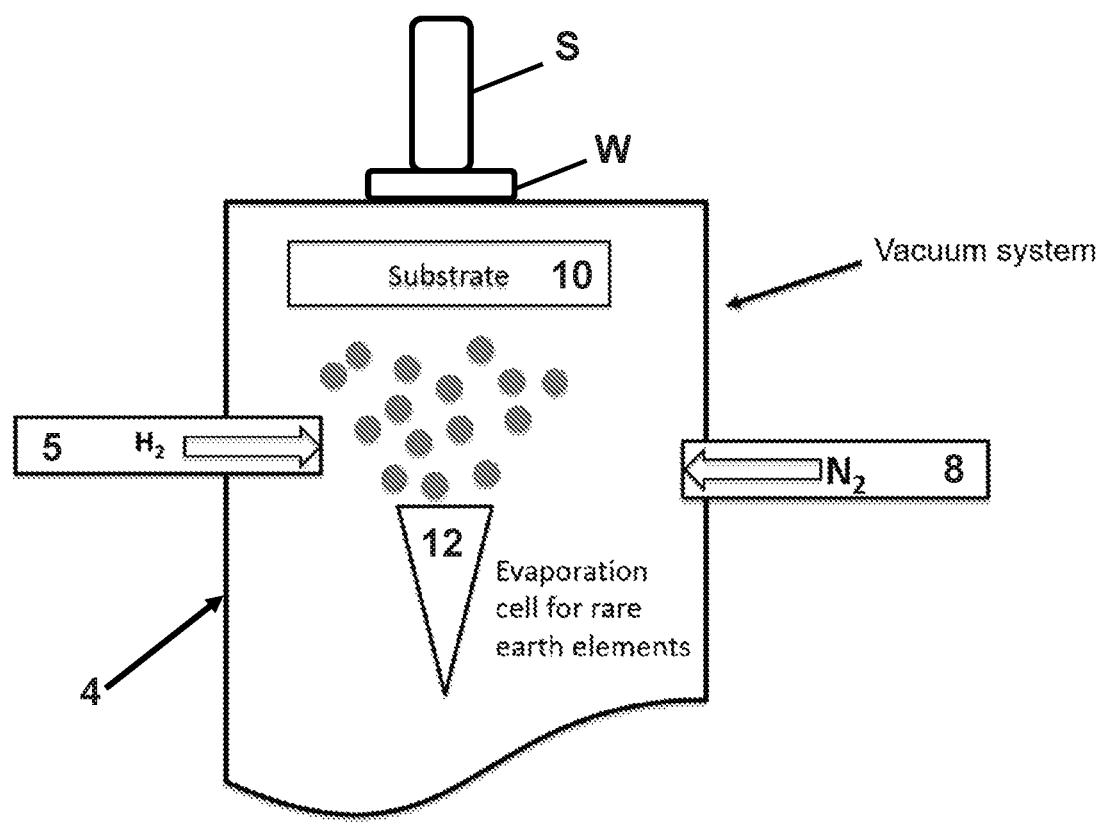
Figure 6A:
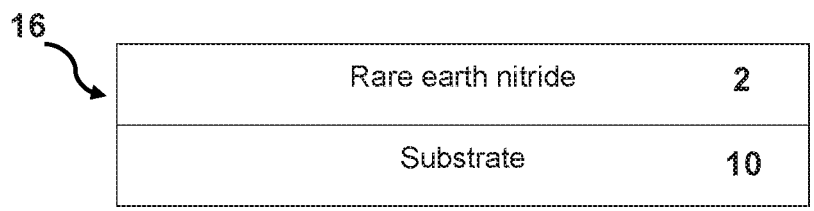
Figure 6B:
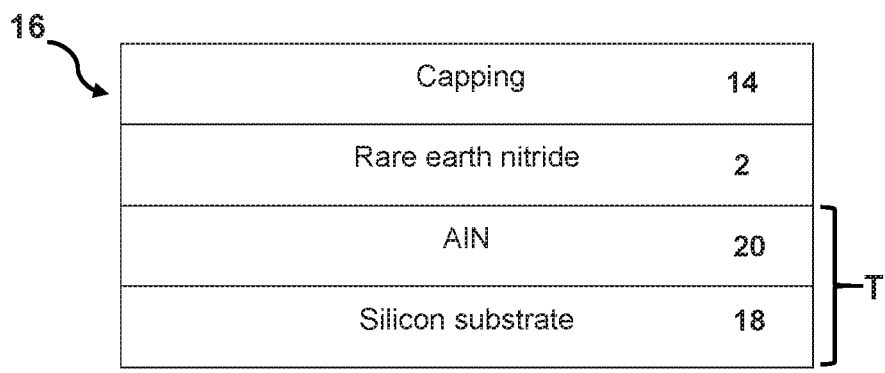
Figure 6C:
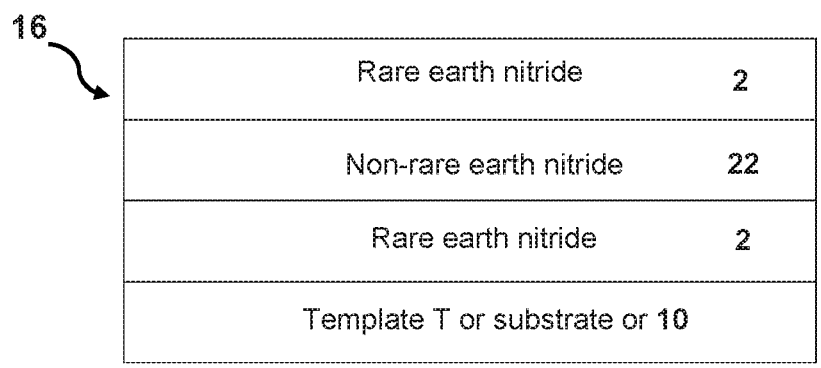
Figure 7:
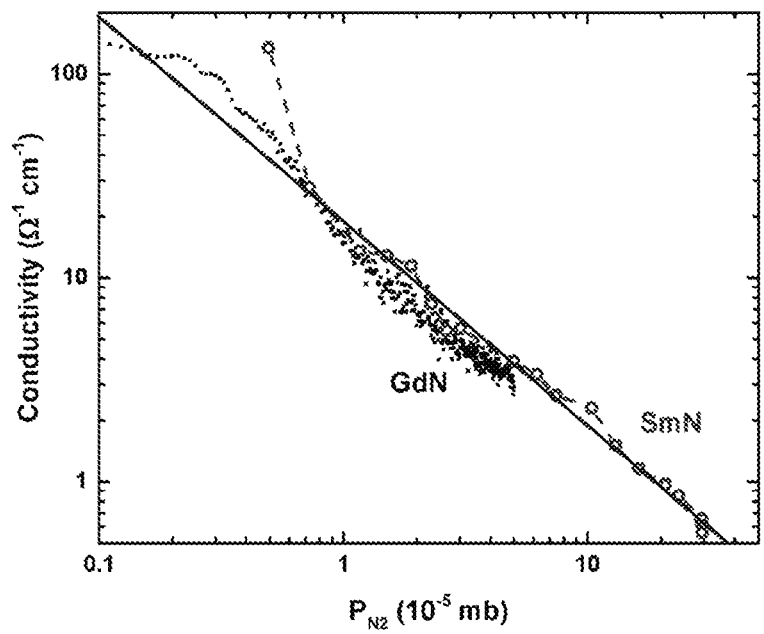
Figure 8:
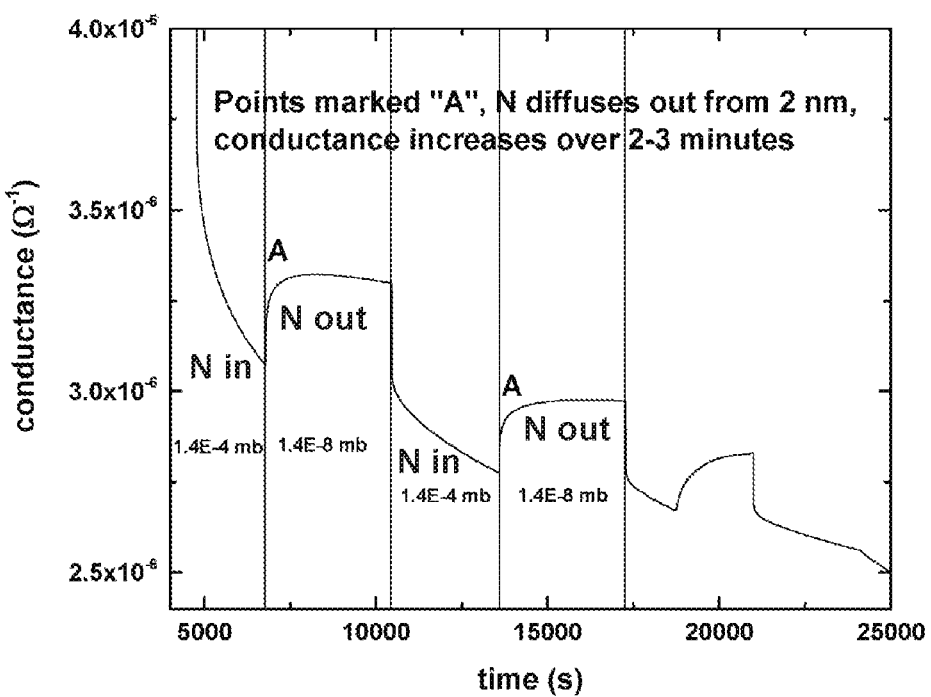
Figure 9:
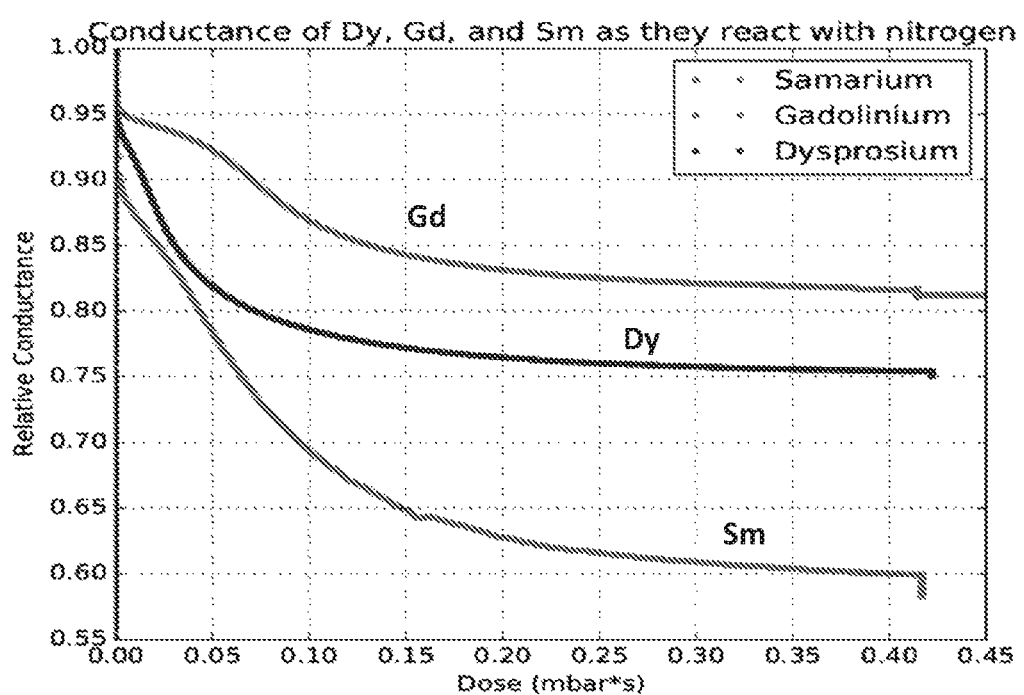

FIG. 5 schematically shows an exemplary apparatus for carrying out ammonia production according to one aspect of the present invention;

FIG. 6A schematically shows an exemplary structure that can be used in the ammonia production method according of the present invention;

FIG. 6B schematically shows another exemplary structure that can be used in the ammonia production method according of the present invention;

FIG. 6C schematically shows another exemplary structure that can be used in the ammonia production method according of the present invention;

FIG. 7 shows how the measured electrical conductivity a of a rare earth nitride depends on how fully nitrided the rare earth nitride is;

FIG. 8 shows how the electrical conductance of a rare earth nitride varies over time measured while $N_2$ is introduced and removed from a vacuum chamber containing the rare earth nitride, and FIG. 9 shows the relative change in electrical conductance ($\Delta C = C_0 - C$) of a Gd, Sm and Dy layer while expose to molecular nitrogen $N_2$, where C is the measured conductance and $C_0$ the initial conductance of the Gd, Sm and Dy layer taken such as $C_0 = 1$ Siemens (S). The $N_2$ exposure results in a decrease of the electrical conductance corresponding to the nitridation of the Gd, Sm and Dy layer into GdN, SmN and DyN, respectively.

Herein, identical reference numerals are used, where possible, to designate identical elements that are common to the Figures.

DETAILED DESCRIPTION OF SEVERAL EMBODIMENTS

FIGS. 1A to 1C schematically shows different exemplary steps of the ammonia production method according to one aspect of the present invention.

In the ammonia $NH_3$ production method a rare earth nitride material or layer 2 is provided as for example illustrated in FIG. 1A. The rare earth nitride material or layer 2 is preferably located inside an enclosed chamber 4.

The chamber 4 can, for example, be a vacuum chamber. A vacuum, a regime where the bulk gases from a system are removed, is created or present inside the chamber 4, for example, by pumping gas or matter out of the chamber 4.

Atomic nitrogen or nitrogen is released from the rare earth nitride material or layer 2 at a pressure value in the vacuum chamber (or at the surface of the rare earth nitride material or layer 2) that assures the removal of elements or contaminants in the chamber to at least a level that allows the atomic nitrogen or Nitrogen N to be released from the rare earth nitride material or layer 2, and in particular, from the surface 3.

The pressure value in the vacuum chamber (or at the surface of the rare earth nitride material or layer 2) is between, for example, (i) $1\times10^{-3}$ Torr ($1.333\times10^{-1}$ Pa) and (ii) $1\times10^{-9}$ Torr ($1.333\times10^{-7}$ Pa) or lower.

Atomic nitrogen or nitrogen is released from the rare earth nitride material or layer 2 at a pressure value in the vacuum chamber (or at the surface of the rare earth nitride material or layer 2) between $1\times10^{-4}$ Torr ($1.333\times10^{-2}$ Pa) and (ii) $1\times10^{-9}$ Torr ($1.333\times10^{-7}$ Pa) or lower; or $1\times10^{-5}$ Torr ($1.333\times10^{-3}$ Pa) and (ii) $1\times10^{-9}$ Torr ($1.333\times10^{-7}$ Pa) or lower, or $1\times10^{-6}$ Torr ($1.333\times10^{-4}$ Pa) and (ii) $1\times10^{-9}$ Torr ($1.333\times10^{-7}$ Pa) or lower; or (i) $1\times10^{-7}$ Torr ($1.333\times10^{-5}$ Pa) and (ii) $1\times10^{-9}$ Torr ($1.333\times10^{-7}$ Pa) or lower; or between (i) $1\times10^{-8}$ Torr ($1.333\times10^{-6}$ Pa) and (ii) $1\times10^{-9}$ Torr ($1.333\times10^{-7}$ Pa) or lower. This pressure is the pressure value in the chamber in the absence of hydrogen $H_2$ that is provided to produce $NH_3$. The pressure in the chamber can be measured, for example, using a Pfeiffer gauge based on the Bayard-Alpert principle.

The precise pressure value used depends on the environment and elements inside the chamber 4 that are to be removed from the chamber in order to avoid or minimise contamination of the rare earth nitride material or layer 2.

Atomic nitrogen or nitrogen is released when the temperature in the (vacuum) chamber (or of the rare earth nitride material or layer 2 or surface 3) is at room temperature (for example, 20 to 35° C. (extremity values of the range included) or a higher temperature. The temperature can be increased to, for example, 500° C., 1000° C., 1500° C. or higher. The temperature range at which atomic nitrogen is released can thus be, for example, between (i) room temperature and (ii) 300° C., or 350° C., or 400° C., or 450° C., or 500° C. or 1000° C. or 1500° C. or 2000° C. Release also occurs, for example, at 650° C. or 700° C. and 1000° C. or 1500° C. or 2000° C.

It is preferable that oxygen is fully removed from the chamber 4 (oxygen-free), or at least removed to a level or quantity that cannot be detected in the residual atmosphere of the chamber 4 within, for example, the sensitivity limit of a conventional mass spectrometer to assure non-ignition of the hydrogen-oxygen mixture in the chamber 4. It is also preferable that the chamber 4 is a water-free or water vapor-free chamber, or at least removed to a level or quantity that cannot be detected in the residual atmosphere of the chamber 4 within, for example, the sensitivity limit of a conventional mass spectrometer.

$O_2$ and water-vapor can, for example, be removed by conventional techniques or methods used in ultra-high vacuum technology such as, but not limited to, by baking of the vacuum system (150 to 450° C.), and/or by using dedicated pumping system such as turbo or cryogenic pumps. Lowering the temperature of all parts of the vacuum system to trap or reduce the outgassing of $O_2$, water-vapor and other contaminants.

The rare earth nitride material or layer 2 can include an atomically clean external surface 3.

The term "atomically clean" is used herein to refer to a surface where contaminants or impurities, for example, oxygen is present in an amount corresponding to less than 10%, or 5%, or 2%, or 1%, or 0.5% of a monolayer or preferably less than 0.1% of a monolayer or more preferably less than 0.01% of a monolayer. The rare earth nitride material or layer 2 is, for example, a non-oxidised rare earth nitride material or layer and/or an iron-free rare earth nitride material or layer and/or a ruthenium-free rare earth nitride material or layer. The external surface 3 can be, for example, a fully rare earth nitride atomic surface. That is the surface 3 comprises substantially rare earth nitrides or consists solely of rare earth nitrides.

The surface 3 can be, for example, a (substantially) stoichiometric surface. The rare earth nitride material or layer 2 can be, for example, a (substantially) stoichiometric layer.

The rare earth nitride material or layer 2 has, for example, a concentration of impurities (or impurity level) that is 10% or less, or 5% or less, or 2% or less or 1% or less of the total concentration of atoms (atoms/cm$^3$) in the rare earth nitride material or layer 2.

The rare earth nitride material 2 can for example be provided in grinded or crushed form, or as a powder. Alternatively, the powder form can be produced inside the chamber by, for example, grinding rare earth nitride material, or alternatively by exposure of a rare earth powder to molecular nitrogen.

Hydrogen $H_2$ is provided while the rare earth nitride material or layer 2 is under vacuum in the chamber 4 and reacts with nitrogen N or monatomic nitrogen atoms N released at the external surface 3 of the rare earth nitride material or layer 2 to produce ammonia $NH_3$, as for example shown in FIG. 10.

Hydrogen is provided as dihydrogen or molecular hydrogen $H_2$ as, for example, a gas stream.

The $H_2$ gas provided can be oxygen-free and/or water-free.

Hydrogen may alternatively or additionally be provided in other forms, for example, as water $H_2O$. Nevertheless, a molecular hydrogen $H_2$ gas source is preferable.

Alternatively, an inert atmosphere can be created in the chamber 4. For example, a noble gas atmosphere, for example, a controlled Argon gas or a controlled Helium atmosphere can be created in the chamber 4. Ammonia $NH_3$ is produced in the same manner as set out above as when the chamber 4 is under vacuum. As previously mentioned, the chamber 4 can be an oxygen-free chamber and/or a water-free or water vapor-free chamber.

The external surface 3 of the rare earth nitride material or layer 2 can consist solely of rare earth nitride atoms. The external surface 3 can include at least one area consisting solely of rare earth nitride atoms (rare earth and/or nitrogen atoms), where this area is a sub-area of the area defined by the surface 3. The external surface 3 can also include a plurality of areas consisting solely of rare earth nitride atoms. Nitrogen N or monatomic nitrogen atoms N are released at these areas of the external surface 3 permitting $NH_3$ to be produced.

The surface 3 includes, for example, at least 70%, or preferably at least 80%, or more preferably at least 90% or at least 95% rare earth or nitrogen atoms.

Methods for determining a quantitative elemental composition of surface contamination can be found, for example, in Surface and Thin Film Analysis: A Compendium of Principles, Instrumentation, and Applications edited by Henning Bubert, Holger Jenett, Wley-VCH Verlag GmbH & Co. KGaA (2011).

The areas of only rare earth nitride atoms extend, for example, at least over a distance of a few lattice constants, for example, between 2 to 5 (extremity values of this range included).

The rare earth material or layer 6 may alternatively be reacted with water or water vapor, instead of molecular $H_2$, to produce $NH_3$.

Energy can be applied to the rare earth nitride material or layer 2 to enhance the release of nitrogen N or monatomic nitrogen atoms N, as shown for example in FIG. 1B. For example, the rare earth nitride material or layer 2 is heated through absorption of electromagnetic radiation to release nitrogen N or monatomic nitrogen atoms N. The chamber 4 can, for example, include a window W (see for example FIG. 5) through which electromagnetic radiation emitted by an electromagnetic radiation source S enters the chamber 4. The electromagnetic radiation has a wavelength or wavelength range that is absorbed by the rare earth nitride material or layer 2 or a structure, material or layer thermally in contact with the rare earth nitride material or layer 2 so as to heat the rare earth nitride material or layer 2. Alternatively, heating can be carried out using techniques such as direct current flowing through the layer or the structure, or via thermal conduction through a hot plate. It is not necessary to apply heat for the nitrogen N or monatomic nitrogen atoms N to be released at the external surface 3 of the rare earth nitride material or layer 2, this can happen in the vacuum chamber 4 at a predetermined pressure. The application of heat energy permits the monatomic nitrogen release to be enhanced.

Hydrogen $H_2$ is introduced into the chamber 4 and reacts with the nitrogen N or monatomic nitrogen atoms N released by the rare earth nitride material or layer 2 to produce ammonia $NH_3$, as for example shown in FIG. 10.

Hydrogen can be introduced into the chamber 4, for example, via an inlet or gas injector 5 as illustrated in FIG. 5. Alternatively, a heated injector injecting $H_2$ into the chamber can be used permitting heated $H_2$ to react with the released nitrogen. The chamber 4 may, for example, include a gas inlet and outlet permitting to create an insert atmosphere. The gas inlet and outlet are configured to inject and remove gas to create and control, for example, a noble gas atmosphere in the chamber 4, or for example a controlled Argon or Helium atmosphere in the chamber 4.

The noble gas can be provided, for example, through a Mass Flow Controller system that allows or not the flow of gas into the vacuum chamber. The Mass Flow Controller system also provides a precise control of the pressure of the noble gas into the chamber.

Energy can be applied to the rare earth nitride material or layer 2 simultaneously during the exposure of the rare earth nitride material or layer 2 to hydrogen. This can alternatively be done sequentially.

Figure 2A:
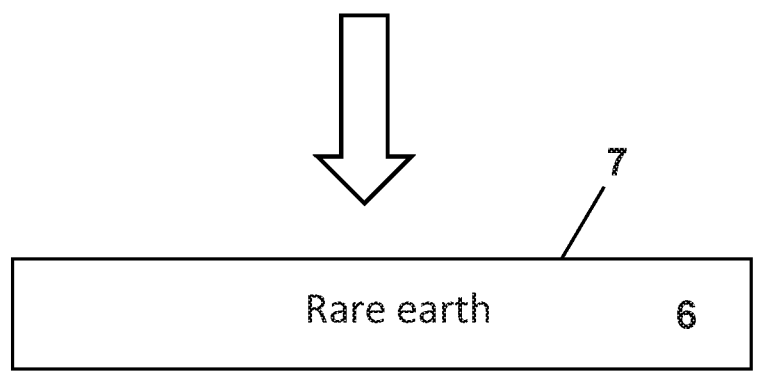

According to another aspect of the present invention, the rare earth nitride material or layer 2 can be obtained by providing a rare earth material or layer 6, (for example, having an atomically clean external surface 7) and exposing external surface 7 of the rare earth material or layer 6 to molecular nitrogen $N_2$, as for example, illustrated in FIG. 2A. The molecular nitrogen $N_2$ is dissociated by the rare earth material or layer 6 and the rare earth nitride material or layer 2 is formed.

The rare earth material 6 can be provided in grinded or crushed form, or as a powder. Alternatively, the powder form can be produced inside the chamber by, for example, grinding rare earth material.

The molecular nitrogen $N_2$ provided can be, for example, oxygen-free and/or water-free.

The external surface 7 of the rare earth material or layer 6 can consist solely of rare earth atoms. The external surface 7 can include at least one area consisting solely of rare earth atoms, where this area is a sub-area of the area defined by the surface 7. The external surface 7 can also include a plurality of areas consisting solely of rare earth atoms. Molecular nitrogen is dissociated at these areas to form a rare earth nitride.

The areas of only rare earth atoms extend, for example, at least over a distance of a few lattice constants, for example, between 2 to 5 (extremity values of the range included).

The surface 7 includes, for example, at least 70%, or preferably at least 80%, or more preferably at least 90% or at least 95% rare earth atoms.

The rare earth material or layer 6 has, for example, a concentration of impurities (or impurity level) that is 10% or less, or 5% or less, or 2% or less or 1% or less of the total concentration of atoms (atoms/cm$^3$) in the rare earth material or layer 6.

The rare-earth atoms on the surface 7 break or dissociate the $N_2$ molecule at room temperature (for example, 20 to 35° C.) and under pressures much lower than one atmosphere or 760 Torr, for example, (typically) under a pressure of $10^{-6}$ atmosphere (or $7.6 \times 10^{-4}$ Torr or 0.101325 Pa) or less; for example, from $10^{-6}$ atmosphere (or $7.6 \times 10^{-4}$ Torr or 0.101325 Pa) to $10^{-9}$ atmosphere (or $7.6 \times 10^{-7}$ Torr or 0.000101325 Pa). The pressure values correspond to the pressure value in the vacuum chamber (or at the surface of the rare earth material or layer 6) during $N_2$ exposure as measured, for example, using a Pfeiffer gauge based on the Bayard-Alpert principle. The temperature in the vacuum chamber or of the rare earth material or layer 6 (or surface 7) can be at room temperature or a higher temperature than room temperature.

The rare earth material or layer 6 can, for example, be provided in the chamber 4. Molecular nitrogen $N_2$ can be introduced into the chamber 4, for example, via an inlet or gas injector 8 as illustrated in FIG. 5. The contact with the rare earth material or layer 6 or more particularly the external surface 7 of the rare earth material or layer 6 results in a breaking of the very strong triple bond of molecular nitrogen $N_2$ forming the rare earth nitride material or layer 2.

Figure 2B:
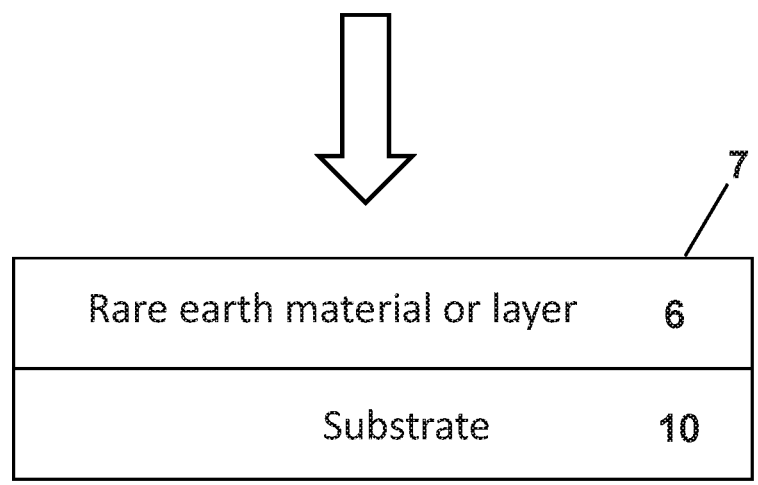

According to another aspect of the present invention, the rare earth material or layer 6 can be produced by depositing a rare earth element on a substrate 10, as for example, illustrated in FIG. 2B and FIG. 5. An evaporation cell 12, for example, evaporates a rare earth element and the rare earth atoms contact the substrate 10 to form a rare earth material or layer 6 having an atomically clean outer surface 7 on the substrate 10. FIG. 5 schematically shows the evaporation of a rare earth element by evaporation cell 12 towards the substrate 10.

The steps of producing the rare earth material or layer 6 by depositing of a rare earth element on a substrate 10 and exposing the rare earth material or layer 6 to molecular nitrogen $N_2$ can be carried out simultaneously or alternatively be carried out sequentially.

Following production of the rare earth nitride material or layer, the exposure to molecular nitrogen $N_2$ can be removed or reduced.

After removing or reducing the exposure to molecular nitrogen $N_2$, hydrogen $H_2$ can be provided to react with nitrogen N or monatomic nitrogen atoms N released at the external surface 3 of the rare earth nitride material or layer to produce ammonia $NH_3$.

The external surface 3 can be, for example, simultaneously exposed to a molecular nitrogen $N_2$ and hydrogen $H_2$ gas mixture. The molecular nitrogen $N_2$ and hydrogen $H_2$ gas mixture can be, for example, oxygen-free or $O_2$-free.

The substrate 10 represented in the Figures is a schematic and exemplary representation of a substrate. The substrate, however, can be for example any underlying surface, substance or material (of any shape) on which the rare earth material or layer 6 is located or deposited (directly or indirectly), or on which the rare earth nitride material or layer 2 is located or deposited (directly or indirectly).

The rare earth material or layer 6 is, for example, a non-oxidised rare earth material or layer and/or an iron-free rare earth material or layer. The external surface 7 can be for example a fully rare earth atomic surface. That is the surface 7 comprises substantially rare earth atoms or elements or consists solely of a rare earth atoms or elements.

The surface 7 can be, for example, a (substantially) stoichiometric surface. The rare earth material or layer 6 can be, for example, a (substantially) stoichiometric layer.

The above described method is for producing ammonia by introducing Hydrogen $H_2$ into the chamber 4. However, other Nitrogen containing products/compounds can alternatively be produced. The present method can thus be a Nitrogen containing product or compound production method where a reacting substance or gas is introduced into the chamber 4 to react with the nitrogen N or monatomic nitrogen atoms N released by the rare earth nitride material or layer 2 to produce the Nitrogen containing product or compound, or an intermediate product or compound.

The reacting substance or gas can be introduced into the chamber 4, for example, via the inlet or gas injector 5 as illustrated in FIG. 5.

According to another aspect of the present invention, when a rare earth nitride material or layer 2 is provided, as for example illustrated in FIG. 1A, the rare earth nitride material or layer 2 may be in contact (directly or indirectly) with a capping material or layer 14 as for example shown in FIG. 6B. The capping material or layer 14 protects the rare earth nitride material or layer 2 to avoid a reaction with the ambient atmosphere that may decompose or oxidise the rare earth nitride material or layer 2. The capping material or layer 14 is removed from the rare earth nitride material or layer 2 in the chamber 4 to expose an atomically clean external surface 3 allowing the rare earth nitride material or layer 2 to release nitrogen N or monatomic nitrogen atoms, for example by applying energy thereto.

The capping 14 is for passivating the rare earth nitride material or layer 2, for example, to protect the rare earth nitride against oxidation. The capping 14 is a removable capping, for example, removable by evaporation or sublimation under a vacuum, including an ultra-high vacuum. The removable passivating capping layer 14 can for example include or consist solely of: samarium, europium, thulium, magnesium, indium, antimony, bismuth, zinc, arsenic, silver, strontium, cadmium, calcium, lead, sodium, or tellurium.

The capping 14 may be epitaxial with doped or un-doped rare earth nitride material. The capping 14 may be polycrystalline, or amorphous with doped or un-doped rare earth nitride material. The capping or capping layer thickness is preferably between about 1 to 200 nm, for example, between 120 to 150 nm or about 40 to 50 nm. It is preferably as thin as possible but thicknesses greater than 200 nm will also technically work.

The capping 14 is removed at high temperature. The temperature corresponds to the temperature of evaporation/sublimation of the material considered or a higher temperature. It is to be noted that the temperature of evaporation/sublimation value chosen is a function of the pressure in the chamber. The capping layer is removed by evaporation or sublimation taking place in a vacuum or an ultra-high vacuum system. The pressure in the vacuum system is typically about $10^{-3}$ Torr or lower. Heating can be carried out, for example, using the electromagnetic radiation source S that can be for example a conventional heater for ultra-high vacuum technology, for example, a radiant resistive heater for heating up to a temperature of 1500° C. The removal of the capping material or layer 14 exposes, for example, an atomically clean external surface 3 allowing the rare earth nitride material or layer 2 to release nitrogen N or monatomic nitrogen atoms.

The provision of the rare earth material or layer 6 or its deposition on substrate 10 and exposition to molecular nitrogen to produce the rare earth nitride material or layer 2 can be carried out in the same chamber 4 in which the rare earth nitride material or layer 2 is used to produce ammonia (such as the chamber schematically illustrated in FIG. 5), or can alternatively be carried out in a second vacuum chamber (unillustrated). The second vacuum chamber can be an independent chamber and in such a case a capping material or layer 14 is provided on the rare earth nitride material or layer 2 for protection during the transfer to the vacuum chamber in which ammonia production will be carried out.

Alternatively, the second vacuum chamber is interconnected in a closed manner under vacuum to the vacuum chamber 4 allowing transfer of the produced rare earth nitride material or layer 2 to the vacuum chamber 4 for the production of ammonia. The rare earth nitride material or layer 2 can be transferred between chambers without exposure to the ambient atmosphere and a capping material or layer 14 on the rare earth nitride material or layer 2. The second vacuum chamber can be similar to the chamber 4 shown schematically in FIG. 5 but a hydrogen inlet is not necessary.

The rare earth material or layer 6 includes or consists of a rare earth selected from the following group: lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu).

In other words, the rare earth material or layer 6 includes or consists solely of lanthanum (La), or cerium (Ce), or praseodymium (Pr) or neodymium (Nd) or samarium nitride (Sm) or europium (Eu) or gadolinium (Gd) or terbium (Tb) or dysprosium (Dy) or holmium (Ho) or erbium (Er) or thulium (Tm) or ytterbium (Yb) or lutetium (Lu).

The rare earth material or layer 6 can include or consist solely of a rare earth alloy of any two or more of the rare earths selected from the following group: lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu).

In other words, the rare earth material or layer 6 can include or consist solely of a rare earth alloy of any two or more of lanthanum (La), or cerium (Ce), or praseodymium (Pr), or neodymium (Nd), or samarium (Sm), or europium (Eu), or gadolinium (Gd), or terbium (Tb), or dysprosium (Dy), or holmium (Ho), or erbium (Er), or thulium (Tm), or ytterbium (Yb), or lutetium (Lu).

The rare earth material or layer 6 is an epitaxial, a polycrystalline or an amorphous material or layer. The rare earth material or layer 6 is preferably between about 1 to 2000 nm in thickness.

The rare earth nitride material or layer 2 can include or solely consist of a rare earth nitride selected from the following group: lanthanum nitride (LaN), cerium nitride (CeN), praseodymium nitride (PrN), neodymium nitride (NdN), samarium nitride (SmN), europium nitride (EuN), gadolinium nitride (GdN), terbium nitride (TbN), dysprosium nitride (DyN), holmium nitride (HoN), erbium nitride (ErN), thulium nitride (TmN), ytterbium nitride (YbN), lutetium nitride (LuN).

In other words, the REN material or layer 2 can include or solely consist of lanthanum nitride (LaN), or cerium nitride (CeN), or praseodymium nitride (PrN), or neodymium nitride (NdN), or samarium nitride (SmN), or europium nitride (EuN), or gadolinium nitride (GdN), or terbium nitride (TbN), or dysprosium nitride (DyN), or holmium nitride (HoN), or erbium nitride (ErN), or thulium nitride (TmN), or ytterbium nitride (YbN), or lutetium nitride (LuN), or any combination of the previously mentioned rare earth nitrides.

The rare earth nitride material or layer 2 can include or solely consist of a rare earth nitride alloy of any two or more of the rare earth nitrides selected from the following group: lanthanum nitride (LaN), cerium nitride (CeN), praseodymium nitride (PrN), neodymium nitride (NdN), samarium nitride (SmN), europium nitride (EuN), gadolinium nitride (GdN), terbium nitride (TbN), dysprosium nitride (DyN), holmium nitride (HoN), erbium nitride (ErN), thulium nitride (TmN), ytterbium nitride (YbN), lutetium nitride (LuN).

In other words, the rare earth nitride material or layer 2 can include or solely consist of a rare earth nitride alloy of any two or more of lanthanum nitride (LaN), or cerium nitride (CeN), or praseodymium nitride (PrN), or neodymium nitride (NdN), or samarium nitride (SmN), or europium nitride (EuN), or gadolinium nitride (GdN), or terbium nitride (TbN), or dysprosium nitride (DyN), or holmium nitride (HoN), or erbium nitride (ErN), or thulium nitride (TmN), or ytterbium nitride (YbN), or lutetium nitride (LuN).

The rare earth nitride material or layer 2 is an epitaxial, a polycrystalline or an amorphous material or layer. The rare earth nitride material or layer 2 is preferably between about 1 nm to 2000 nm in thickness.

The rare earth nitride material or layer 2 can be part of or included in a structure 16. The structure 16 can consist of or include a substrate 10 upon which the rare earth nitride material or layer 2 is directly or indirectly in contact, as shown for example in FIG. 6A. The structure 16 may comprise one rare earth nitride material or layer 2, or multiple successive rare earth nitride materials or layers 2. The structure 16 may comprise multiple successive rare earth nitride materials or layers 2 where successive materials or layers are different rare earth nitrides.

This structure may include the template T comprising a substrate 18 and a deposition layer upon which the rare earth nitride material or layer 2 is in direct or indirect contact, as shown for example in FIG. 6B. The capping 14 is optional. For example, the substrate 18 can be a (111) silicon substrate and the deposition layer 20 is a hexagonal (0001)-oriented AlN deposition layer on the silicon substrate. A SmN rare earth nitride material or layer 2 can be for example located on the deposition layer 20 of the template T and in direct contact with the deposition layer 20 of the template T. Additional rare earth nitride materials or layers 2 can be included.

The structure 16 may also include one or a plurality of non-rare earth nitride materials or layers 22 in addition to the rare earth nitride material or layer 2 as shown in for example in FIG. 6C.

The substrate 10 or template T can be a single crystal, epitaxial, polycrystalline or amorphous. To produce the rare earth nitride material or layer 2, the rare earth material or layer 6 can be deposited onto a substrate 10 or template T.

The rare earth elements mentioned above can be deposited using vacuum or ultra-high vacuum techniques. Suitable techniques include, but are not limited to, physical vapour deposition (PVD), including pulsed laser deposition (PLD) and DC/RF magnetron sputtering, thermal evaporation, and molecular beam epitaxy (MBE). Other techniques, including but not limited to metalorganic chemical vapour deposition (MOCVD), may also be used.

Rare-earth nitride layers can be grown, for example, by sputtering. For example, a GdN layer can be grown on an AlN substrate or layer at 500° C. by reactive radiofrequency (RF) magnetron sputtering in an ultrahigh vacuum chamber with a base pressure of approximately $6 \times 10^{-6}$ Pascal. The growth chamber is equipped with Gd (99.9% pure) solid target. An ultrapure (99.9999%) gas mixture of argon and nitrogen for reactive growth, and the partial pressure ratio is typically Ar:$N_2$ ratio=9:6 sccm. The total sputtering pressure is about 5 Pa. The input RF power is about 250 W. The resulting GdN growth rate is about 2.0 nm/s.

Rare-earth nitride layers can also, for example, be grown by pulsed laser deposition. For example, the growth conditions below allow to grow epitaxial GdN on a YSZ substrate:

GdN thin films were grown on double-side polished (100)-oriented yttria-stabilized zirconia (YSZ) substrates that were degreased by 5 min immersion in each of trichloroethylene, acetone, and methanol before transfer to the growth chamber (base pressure $10^{-9}$ Torr). Substrates were outgassed at 800° C. for a minimum of 1 hour. A Lambda Physik Compex 205 KrF excimer laser with wavelength of 248 nm and pulse length of 25 ns was operated at a repetition rate of 10 Hz with an energy density at the target ranging from 2 to 8 J cm$^{-2}$. A 99.9% purity elemental Gd sputtering target was employed for GdN growth and a YSZ substrate was used as a target for film capping. 99.999% pure nitrogen gas was passed through an Aeronex filter to an Oxford Applied Research HD25 rf plasma source operated at powers ranging from 120 to 400 W and pressures ranging from $2.5 \times 10^{-5}$ to $1.2 \times 10^{-4}$ Torr. Target-to-substrate distance was fixed at 6.0 cm.

Rare-earth nitride can also be grown, for example, by chemical vapour deposition on an AlN layer grown by CVD.

For example, the metalorganic precursors, tris(N,N'-diisopropyl-acetamidinato)gadolinium(III) [Gd(DPAMD)3] and hexakis(dimethylamido)dialuminium(III) [Al$_2$(NMe$_2$)$_6$], employed for the deposition of GdN and AlN respectively, were synthesized following previously reported methods in the literature. For example, see T. B. Thiede, M. Krasnopolski, A. P. Milanov, T. de los Arcos, A. Ney, H.-W. Becker, D. Rogalla, J. Winter, A. Devi, R. A. Fischer, Chem. Mater. 23, 1430-1440 (2011); or K. M. Waggoner, M. M. Olmstead, P. P. Power, Polyhedron 9, 257-263 (1990); or P. Drose, S. Blaurock, C. G. Hrib, F. T. Edelmann, Z. Anorg. Allg. Chem. 637, 186-189 (2010). Film depositions via CVD were performed in a custom-built horizontal cold-wall reactor. Before deposition, 1 cm$^2$ Si(100) substrates were cleaned using a sequence of sonication in 2-propanol and water to remove surface contaminations. The vaporizer temperatures were set to 120 and 80° C. for the Gd and Al source, respectively. Nitrogen (5.0) was used as a carrier gas, and all depositions were performed in the presence of dry ammonia. GdN layers were grown at 800° C. with flow rates of 50 sccm for both gases, whereas the deposition temperature for AlN films was set to 400° C. (capping layer) and 500° C. (buffer layer) with flow rates of 25 sccm. All multilayer structures were prepared in a continuous CVD process to avoid interaction of the oxophilic layers with the atmosphere.

The rare earth material or layer 6 is grown or deposited preferably under a high-vacuum, pressures ranging from about $10^{-3}$ Torr (0.1333 Pa) to $10^{-9}$ Torr ($1.333 \times 10^{-7}$ Pa), or ultra-high vacuum pressures lower than about $10^{-9}$ Torr ($1.333 \times 10^{-7}$ Pa) to produce a rare earth metal having an atomically clean surface 7.

The rare earth material or layer 6 can be, for example, deposited using the molecular beam epitaxy (MBE) technique, at room temperature (for example, 20 to 35° C.) or at an elevated temperature above room temperature, and preferentially at temperature lower than the evaporation/sublimation of the rare earth element considered. The deposition is made in a high-vacuum or ultra-high vacuum environment.

The resulting structure can include or consist of at least one rare earth material or layer 6 and the substrate 10 or template T, or multiple successive rare earth materials or layers 6 and the substrate 10 or template T.

The rare earth material or layer 6 is located on the substrate 10 or template T in direct contact or in indirect contact with the substrate 10 or template T. The substrate 10 or template T can be a single crystal, polycrystalline or amorphous.

The growth rate of the metal rare earth material or layer 6 is typically between few nm/h to few μm/h.

Once the rare earth material or layer 6 is deposited, the material or layer is preferably kept under vacuum, or under ultra high vacuum (UHV).

The rare earth material or layer 6 is exposed to pure molecular nitrogen $N_2$ to obtain a rare earth nitride material or layer 2. This exposure can be carried out in the same vacuum chamber or in a different one where the structure 2 is transferred to a different chamber connected under UHV.

As mentioned previously, the exposure to $N_2$ can be carried out with the rare earth material or layer 6 at room temperature (for example, 20 to 35° C.) or alternatively at an elevated temperature above room temperature. The pressure in the chamber during the exposure of $N_2$ can be $10^{-6}$ atmosphere (or $7.6 \times 10^{-4}$ Torr or 0.101325 Pa) or less; for example, from $10^{-6}$ atmosphere (or $7.6 \times 10^{-4}$ Torr or 0.101325 Pa) to $10^{-9}$ atmosphere.

During the exposure the rare earth material or layer 6 is converted into a rare-earth nitride material or layer 2.

The metal rare earth material or layer 6 is exposed to pure molecular nitrogen to completely or partially convert the rare earth material or layer 6 into a rare earth nitride material or layer 2 having an atomically clean outer surface 3.

The precise duration of the molecular nitrogen exposure, and the precise pressure in the chamber under which exposure is carried out depends on the thickness of the rare earth material or layer 6 that is to be converted to a REN material or layer 2. The $N_2$ and chamber pressure is, for example, lower than 1 atmosphere, and for example within the range of $5 \times 10^{-4}$ mbar to $10^{-6}$ mbar. For example, a 25 nm of rare earth Gd layer 6 is completely converted to a GdN material or layer 2 using a $N_2$ exposure where the chamber pressure under $N_2$ exposure is $2 \times 10^{-4}$ mbar for a duration of 10 minutes. The pressure in the chamber can be measured, for example, using a Pfeiffer gauge based on the Bayard-Alpert principle.

The nitridation process of converting the metal rare earth material or layer 6 into a REN material or layer 2, can be done at room temperature or at higher temperatures, but preferably at a temperature lower than the sublimation/evaporation temperature of the rare earth element element considered.

Once the rare earth nitride material or layer 2 is formed, the exposure to $N_2$ can be stopped or reduced. This reduction of pressure of $N_2$ already results in the release of nitrogen N from the external surface 3 of the REN material or layer 2. The REN material or layer 2 can also be produced by evaporating the rare earth element simultaneously in the presence of a partial pressure of pure molecular nitrogen.

In an exemplary embodiment, a 25 nm thick polycrystalline gadolinium film was grown in a molecular beam epitaxy system by evaporating Gd metal using an electron gun in an ultra-high vacuum of $10^{-9}$ Torr. The purity of the as-received Gd solid charge was 3N. The 25 nm thick Gd rare earth material or layer 6 was deposited at room temperature, at typically a temperature of about 30° C. and with a deposition rate of about 150 nm/h, on a commercially available $SiO_2$ layer grown on a silicon substrate.

The Gd rare earth layer was then exposed to $N_2$ within the same molecular beam epitaxy chamber or system. The exposure was carried out at room temperature (about 30° C.) for 10 minutes and under a partial pressure of nitrogen of, for example, $2 \times 10^{-4}$ Torr. The electrical resistivity of the Gd material or layer 6 was measured in-situ before exposure to $N_2$ and during exposure to $N_2$ using a two points voltage-current measurement.

Figure 3:
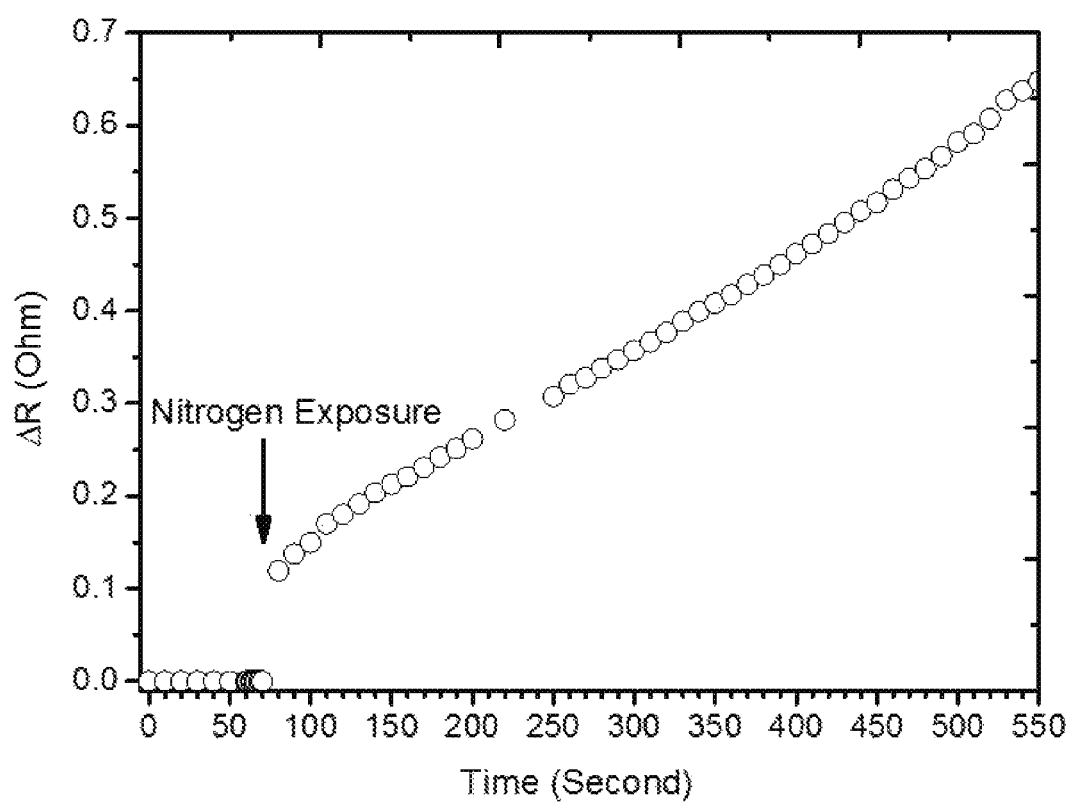
FIG. 3 shows a change in normalised electrical resistance as a function of time during the exposure to $N_2$ of a 25 nm thick rare earth layer.

FIG. 3 shows the change in normalised electrical resistance as a function of time during the exposure to $N_2$ of the 25 nm thick Gd rare earth material or layer 6. FIG. 3 shows the normalized change in electrical resistance ($\Delta R = R - R_0$) where R is the measured resistance and $R_0$ the initial resistance of the Gd layer taken such as $R_0 = 0$ ohm. The $N_2$ exposure results in an increase of the electrical resistance corresponding to the nitridation of the Gd layer into GdN.

Figure 4:
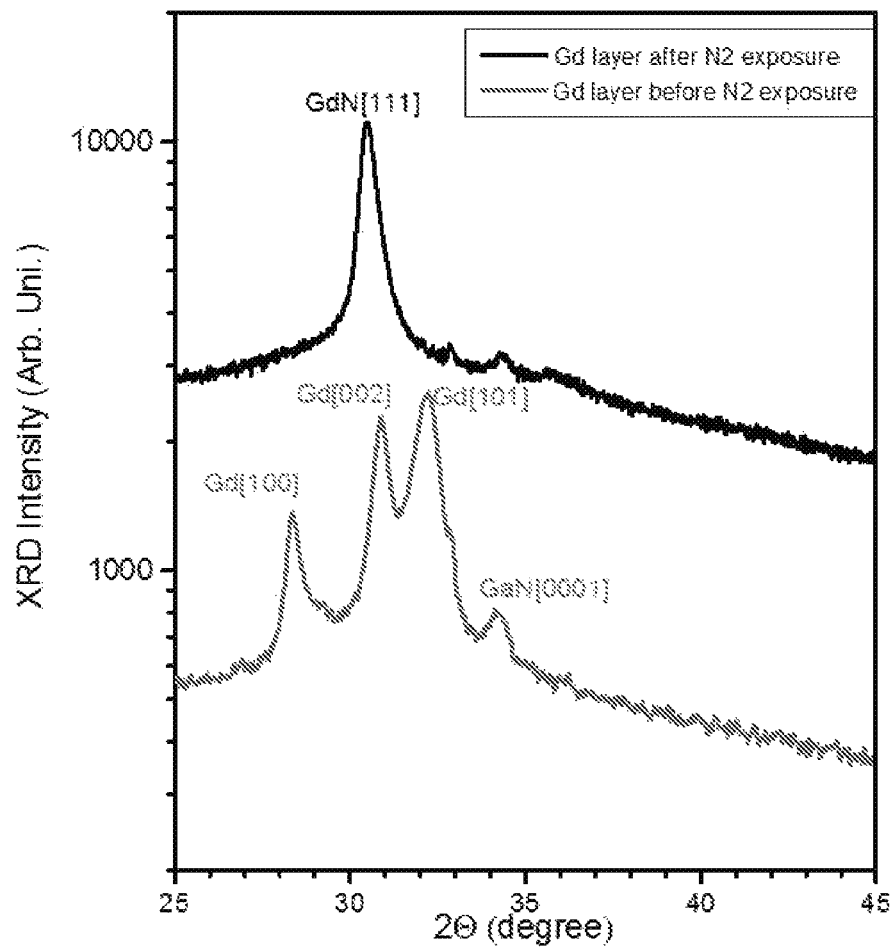
FIG. 4 shows X-ray diffraction omega-2theta scans for a 25 nm thick rare earth layer before $N_2$ exposure (lower curve) and after exposure (upper curve)

To confirm the nitridation of the Gd into GdN X-ray diffraction omega-2theta measurements are performed ex-situ after removing the structures from the molecular beam epitaxy system. In order to prevent modification in air, all structures were capped with a 100 nm to 150 nm thick GaN layer before removing them from the molecular beam epitaxy system. FIG. 4 shows X-ray diffraction omega-2theta scans for a 25 nm thick Gd rare earth layer after $N_2$ exposure (upper curve). The 25 nm thick Gd rare earth layer is exposed to a $N_2$ pressure of $2 \times 10^{-4}$ mbar for a duration of 10 minutes. The XRD scan shows only a peak associated to GdN (111). No trace of pure Gd is detected. For comparison, a XRD scan of a pure Gd rare earth layer is shown (lower curve). The nitridation of the Gd material into GdN is thus confirmed.

The GdN material or layer 6 is heated in the MBE chamber or system to release nitrogen N. The heating is carried out using, for example, a radiant resistive heater, a heater for ultra-high vacuum technology, which can heat up to a temperature of 1500° C. The temperature at which release of the nitrogen N starts depends of the residual pressure in the system but is approximately 600° C. for SmN, at a residual pressure of $5 \times 10^{-8}$ Torr or less. Release of the atomic N can start, however, without heating at a given pressure in the chamber 4. Heating, however, allows atomic nitrogen to be released from deeper inside the REN material or layer 2.

FIGS. 7 to 8 show measured results demonstrating the release of nitrogen N from a rare earth nitride material or layer 2.

FIG. 7 shows how the measured electrical conductivity a of the rare earth nitride material or layer 2 depends on how fully nitrided the rare earth nitride layer is. FIG. 7 shows that the rare nitride layer 2 becomes more conductive as the $N_2$ pressure drops, clearly showing that the layer 2 is doped with nitrogen vacancies, and that the measured electrical conductivity a of the layer 2 can be used as a proxy for the concentration of N in the layer.

FIG. 8 shows how the electrical conductance varies over time measured while $N_2$ is introduced and removed from the chamber. The measured electrical conductance of layer 2 in FIG. 8 shows clearly that nitrogen N goes into the rare earth nitride material or layer 2 at a pressure of $10^{-4}$ mbar of $N_2$ in the chamber and comes out again at a pressure of $10^{-8}$ mbar when the nitrogen is pumped out of the chamber.

FIG. 9 shows a measured relative change in electrical conductance ($\Delta C = C_0 - C$) where C is the measured conductance and $C_0$ the initial conductance of the Gd, Sm and Dy layers taken as $C_0 = 1$ Siemens (S). FIG. 9 shows that $N_2$ exposure results in a decrease of the electrical conductance corresponding to the nitridation of the Gd, Sm and Dy layer into GdN, SmN and DyN, respectively. 15 to 20 nm thick Gd, Sm and Dy rare earth materials were deposited at room temperature, at typically a temperature of about 30° C. and with a deposition rate of about 0.5 Å/s, on a commercially available sapphire substrate on which gold contacts have been deposited using standard e-beam evaporation to allow in-situ electrical measurements. The deposition of the rare earth material took place in an ultra-high vacuum deposition system, such as a molecular beam epitaxy system, with a base pressure of typically $10^{-8}$ Torr or less. The purity of the as-received Gd, Dy and Sm solid charge was 3N. The rare earth layers were then exposed to $N_2$ within the same molecular beam epitaxy chamber or system. The exposure was carried out at room temperature (about 30° C.) for several minutes, typically 10, 20 40 or 60 minutes, and under a partial pressure of nitrogen of $2 \times 10^{-4}$ Torr. The electrical conductance of the Gd, Sm and Dy material was measured in-situ before exposure to $N_2$ and during exposure to $N_2$ using a two-point voltage-current measurement on the pre-deposited gold contacts. As mentioned, FIG. 9 shows the relative change in electrical conductance ($\Delta C = C_0 - C$) and shows that the $N_2$ exposure results in a decrease of the electrical conductance corresponding to the nitridation of the Gd, Sm and Dy layer into GdN, SmN and DyN, respectively.

The rare earth nitride material or layer 2 is thus heated under vacuum or under ultra-high vacuum for example, to a temperature up to 500° C., 1000° C., 1500° C. or 2000° C. The external surface 3 of the REN material or layer 2 releases nitrogen N under vacuum. Hydrogen is introduced to the chamber to recombine with the nitrogen and to form ammonia.

After the formation of ammonia, a further exposition to molecular nitrogen can be carried out to replenish the depleted rare earth nitride material or layer 2 in the manner described above.

The ammonia produced is subsequently collected.

For example, $NH_3$ and other gases can be extracted from the chamber. This purge process includes evacuating the chamber by performing a pump down through an outlet of the chamber. A vacuum pump such as a mechanical dry pump and/or a turbomolecular pump draws process gases out and maintains a suitably low pressure within the reactor. Alternatively or in addition the purge/extraction may include sweeping the reaction chamber with a non-reactive gas, for example Ar. The non-reactive gas may be delivered in a burst push. Optimal purge conditions depend on the architecture and volume of the reaction chamber, or the desired reaction characteristics. A purge or a sweep may be partial, complete or substantially complete. In certain cases, the purge/sweep may not occur.

$NH_3$ and other reactants, for example N and $H_2$, transported outside the chamber can undergo processing and refining before being ready for further use through, for example, the use of filters, compression and liquefaction processes.

The radically different approach of the present invention is based on using the surface 7 of the rare earth material 6 to produce a very efficient breaking of molecular $N_2$ under extremely mild conditions. The inventors have found that rare-earth atoms break and dissociate the $N_2$ molecule at room temperature (20 to 35° C.) and under pressures much lower than one atmosphere, typically 7 to 8 orders of magnitude smaller (from 1 atmosphere to $10^{-7}$ or $10^{-8}$ atmosphere). The formed rare earth nitride 2 stores nitrogen and can the release of the atomic nitrogen from the surface 3 can be triggered to allow ammonia to be produced when $H_2$ is provided to the surface 3. The present invention uses, for example, a metallic thin deposition or layer of rare earth (RE) material as a building block for the production of ammonia ($NH_3$) under extremely mild conditions (room temperature and low pressure) compared to current industrial methods. The RE surface facilitates the breaking of the very strong triple bond of molecular nitrogen ($N_2$) forming a rare earth nitride allowing nitrogen to be provided which can then recombine with hydrogen to produce ammonia.

While the invention has been disclosed with reference to certain preferred embodiments, numerous modifications, alterations, and changes to the described embodiments, and equivalents thereof, are possible without departing from the sphere and scope of the invention. The features of any one of the described embodiments may be included in any other of the described embodiments. The methods steps are not necessary carried out in the exact order presented above and can be carried out in a different order. Accordingly, it is intended that the invention not be limited to the described embodiments, and be given the broadest reasonable interpretation in accordance with the language of the appended claims.

The invention claimed is:

1. Ammonia production method comprising the steps of:
   providing at least one rare earth nitride material or rare earth nitride layer in a chamber;
   creating a vacuum in the chamber with the at least one rare earth nitride material or rare earth nitride layer provided in the chamber, or creating an inert atmosphere in the chamber with the at least one rare earth nitride material or rare earth nitride layer provided in the chamber; and
   providing hydrogen to react with at least one nitrogen atom released at an external surface of the at least one rare earth nitride material or rare earth nitride layer to produce ammonia;
   wherein the at least one rare earth nitride material or rare earth nitride layer comprises an external surface consisting solely of rare earth nitride atoms; or an external surface including at least one area consisting solely of rare earth nitride atoms; or a plurality of areas consisting solely of rare earth nitride atoms, said at least one area or each of said plurality of areas being a sub-area of a surface defined by the external surface.

2. Method according to claim 1, wherein the external surface is an atomically clean rare earth nitride external surface.

3. Method according to claim 1, further including the steps of:
   applying energy to the at least one rare earth nitride material or rare earth nitride layer to release nitrogen, said energy being applied prior to providing hydrogen to the external surface of the at least one rare earth nitride material or rare earth nitride layer, or simultaneously during the provision of hydrogen to the external surface of the at least one rare earth nitride material or rare earth nitride layer.

4. Method according to claim 1, wherein the at least one rare earth nitride material is provided in grinded or crushed form, or as a powder.

5. Method according to claim 1, further including the steps of:
   providing at least one rare earth material or rare earth layer comprising an external surface, or at least one rare earth material or rare earth layer comprising an atomically clean rare earth external surface, or at least one rare earth material or rare earth layer comprising an external surface including at least one area consisting solely of rare earth atoms; or a plurality of areas consisting solely of rare earth atoms, said at least one area or each of said plurality of areas being a sub-area of a surface defined by the external surface; and
   exposing the external surface or the atomically clean rare earth external surface to molecular nitrogen to produce the at least one rare earth nitride material or rare earth nitride layer.

6. Method according to claim 5, wherein the at least one rare earth material is provided in grinded or crushed form, or as a powder.

7. Method according to claim 4, wherein the external surface (3) is simultaneously exposed to a molecular nitrogen and hydrogen gas mixture.

8. Method according to claim 4, further including the steps of:
   providing a substrate; and
   depositing at least one rare earth element on the substrate to produce the at least one rare earth material or rare earth layer.

9. Method according to claim 1, further including the steps of:
   removing a capping material or capping layer from the at least one rare earth nitride material or rare earth nitride layer to expose the rare earth nitride external surface or the atomically clean rare earth nitride external surface.

10. Method according to claim 1, further including the step of carrying out an exposition to molecular nitrogen to replenish a depleted rare earth nitride material or rare earth nitride layer following ammonia production.

11. Method according to previous claim 5, wherein the steps of providing at least one rare earth material or rare earth layer and exposing the at least one rare earth material or rare earth layer to molecular nitrogen are carried out in the chamber, or in a second chamber, or in a second chamber interconnected to the chamber.

12. Method according to previous claim 5, wherein the rare earth material or rare earth layer includes or consists solely of lanthanum, or cerium, or praseodymium, or neodymium, or samarium, or europium, or gadolinium, or terbium, or dysprosium, or holmium, or erbium, or thulium, or ytterbium, or lutetium.

13. Method according to previous claim 1, wherein the rare earth nitride material or rare earth nitride layer includes or consists solely of lanthanum nitride, or cerium nitride, or praseodymium nitride, or neodymium nitride, or samarium nitride, or europium nitride, or gadolinium nitride, or terbium nitride, or dysprosium nitride, or holmium nitride, or erbium nitride, or thulium nitride, or ytterbium nitride, or lutetium nitride.

14. Method according to claim 1, wherein the at least one rare earth nitride layer or rare earth nitride material is non-oxidised.

15. Method according to claim 1, wherein the step of providing at least one rare earth nitride material or rare earth nitride layer in the chamber comprises providing at least one rare earth nitride material or rare earth nitride layer consisting solely of at least one rare earth nitride or consisting solely of at least one rare earth nitride alloy.

16. Method according to claim 1, wherein the step of providing hydrogen to react with nitrogen released at an external surface of the at least one rare earth nitride material or rare earth nitride layer to produce ammonia is carried out at room temperature.

17. Method according to claim 1, wherein the hydrogen is provided as a molecular hydrogen gas stream to react with nitrogen released at an external surface of the at least one rare earth nitride material or rare earth nitride layer to produce ammonia.

* * * * *